United States Patent [19]

Miller et al.

[11] Patent Number: 4,947,893

[45] Date of Patent: Aug. 14, 1990

[54] VARIABLE FORCE SOLENOID PRESSURE REGULATOR FOR ELECTRONIC TRANSMISSION CONTROLLER

[75] Inventors: Ellsworth S. Miller, Rochester Hills; Michael Slavin, Caseville; Ching C. Ling, Plymouth, all of Mich.

[73] Assignee: Lectron Products, Inc., Rochester Hills, Mich.

[21] Appl. No.: 474,251

[22] Filed: Feb. 5, 1990

Related U.S. Application Data

[63] Continuation of Ser. No. 316,998, Feb. 28, 1989, abandoned.

[51] Int. Cl.⁵ .......................................... F15B 13/044
[52] U.S. Cl. ........................... 137/625.65; 251/129.15
[58] Field of Search ................ 137/626.65; 251/129.15

[56] References Cited

U.S. PATENT DOCUMENTS

| | | | |
|---|---|---|---|
| 3,807,441 | 4/1974 | Grosseau | 137/628.65 X |
| 3,995,652 | 12/1976 | Belart et al. | 137/628.65 X |
| 4,316,599 | 2/1982 | Bouvet et al. | 137/628.65 X |
| 4,655,254 | 4/1987 | Hafner et al. | 137/625.65 |
| 4,669,504 | 6/1987 | Fugitsugu et al. | 137/628.65 |
| 4,678,006 | 7/1987 | Northman et al. | |

FOREIGN PATENT DOCUMENTS 2186349 8/1987 United Kingdom ........... 137/628.65

OTHER PUBLICATIONS

Drawing of Check for x-1296 VFS, Spool & Nose, 9/22/86.

*Primary Examiner*—Gerald A. Michalsky
*Attorney, Agent, or Firm*—Harness, Dickey & Pierce

[57] ABSTRACT

A variable force solenoid valve assembly is provided for use in an automatic transmission controller for controllably reducing a fluid inlet pressure to a desired outlet control pressure. The invention includes a variable force solenoid assembly secured to a valve body assembly. The valve body assembly includes a spool valve having three radially extending lands which translates within a valve body central bore in response to movement of an armature assembly provided in the solenoid assembly. Movement of the spool valve generates first and second flow restriction for controllably regulating the reduction of inlet pressure to control pressure. In addition, various improvements in spool valve design are described including a design which provides positive damping of the spool valve so as to attenuate "self-excited" oscillation thereof.

23 Claims, 2 Drawing Sheets

VARIABLE FORCE SOLENOID PRESSURE REGULATOR FOR ELECTRONIC TRANSMISSION CONTROLLER

This application is a continuation of U.S. Ser. No. 316,998 filed Feb. 28, 1989, now abandoned.

BACKGROUND OF THE INVENTION

This invention relates to solenoid operated fluid control devices, and more particularly to a variable force solenoid valve assembly adapted for use in an automatic transmission controller for controllably reducing a fluid inlet pressure to an outlet control pressure.

In the past, automatic transmissions used in motor vehicles were typically controlled through fluidic control systems incorporating numerous piston and cylinder assemblies. Although such devices operate satisfactorily, they have several drawbacks including high cost attributable to the high precision necessary in machining the components and the necessity of providing and assembling numerous components. Further, such systems are restricted in their operational capabilities. Modern motor vehicles are incorporating increasing numbers of electronically controlled sub-systems and particular attention is presently being directed toward designing electronically controlled automatic transmission controllers. This invention relates specifically to an improved variable force solenoid valve assembly which can be employed in such a controller device.

Variable force solenoid valve assemblies are used in electronic transmission controllers to provide control over fluid pressures which are to be provided in response to an electrical input signal supplied to the solenoid. In particular, variable force solenoid valve assemblies are employed to provide regulation of the "shift-feel" of an automatic transmission. "Shift-feel" is the sudden and harsh impact felt by the vehicle operator due to engagement and disengagement of the transmission gearing upon energization of ON/OFF solenoid valves, typically provided in such electronic controllers. Such sudden and harsh shift-feel is extremely undesireable. Variable force solenoid valve assemblies permit the calibration and fine adjustment of shift-feel to provide a smoother transition during transmission gear changes.

A number of significant design challenges are presented in designing a variable force solenoid valve assembly for controllably regulating the fluid pressure delivered to an outlet port of a transmission controller relative to the inlet line pressure. Controlled energization of the solenoid enables the control pressure to be effectively modulated. However, precise regulation of the control pressure necessitates a highly stable fluid flow condition which is directly influenced by the design of the flow control valving components and the fluid communication therethrough. Stable flow conditions tend to minimize undesireable self-excited oscillation of the valving components thereby promoting hydraulic equilibrium conditions.

Typically, variable force solenoid devices are provided with fluid control components consisting of a spool valve having a stem and two radially extending lobes or lands. The spool valve is movably confined within a valve body to create flow restrictions for pressure regulation. Fluid passages are provided in the valve body which communicate with the various surfaces of the spool valve. Commonly, fluid at inlet pressure is delivered to a flow restriction provided between the two spool valve lands. The flow restriction enables the fluid pressure to be reduced to a desired outlet control pressure. However, the fluid forces acting on the two lands of the spool valve generate a negative hydraulic damping characteristic. Negative damping produces self-excited vibration or oscillation of the spool valve during fluid flow conditions. Such self-excited oscillation inhibits accurate regulation of the control pressure. Additionally, the self-excited oscillation of the spool valve makes the variable force solenoid valve unstable and difficult to calibrate.

SUMMARY OF THE INVENTION

The present invention discloses an improved variable force solenoid valve assembly for regulating the outlet control pressure through utilization of valving components providing for positive fluid damping control. Specifically, the present invention discloses flow control components associated with a solenoid valve assembly comprising a three land spool valve confined within a valve body, the combination of which generates positive fluid damping characteristics. This positive fluid damping has the effect of attenuating the amplitude of the natural oscillation or vibration of the spool valve generated by the flow of fluid. Such a design provides extremely stable control over spool valve oscillation which permits improved regulation of the outlet control pressure and accurate and repeatable initial calibration of the valve components.

Another advantage of the variable force solenoid device according to this invention is its ability to be easily calibrated for the desired vehicular application.

Yet another advantage of this invention is its ease of assembly due to the use of pre-calibrated sub-assemblies.

The present invention permits efficient packaging through the use of variable force output solenoids. Excellent fluid flow characteristics are provided by designing the valve elements of the valve body assembly such that they provide passages and orifices designed to reduce the tendency for generation of high frequency oscillation and eddies during fluid flow through the valve.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
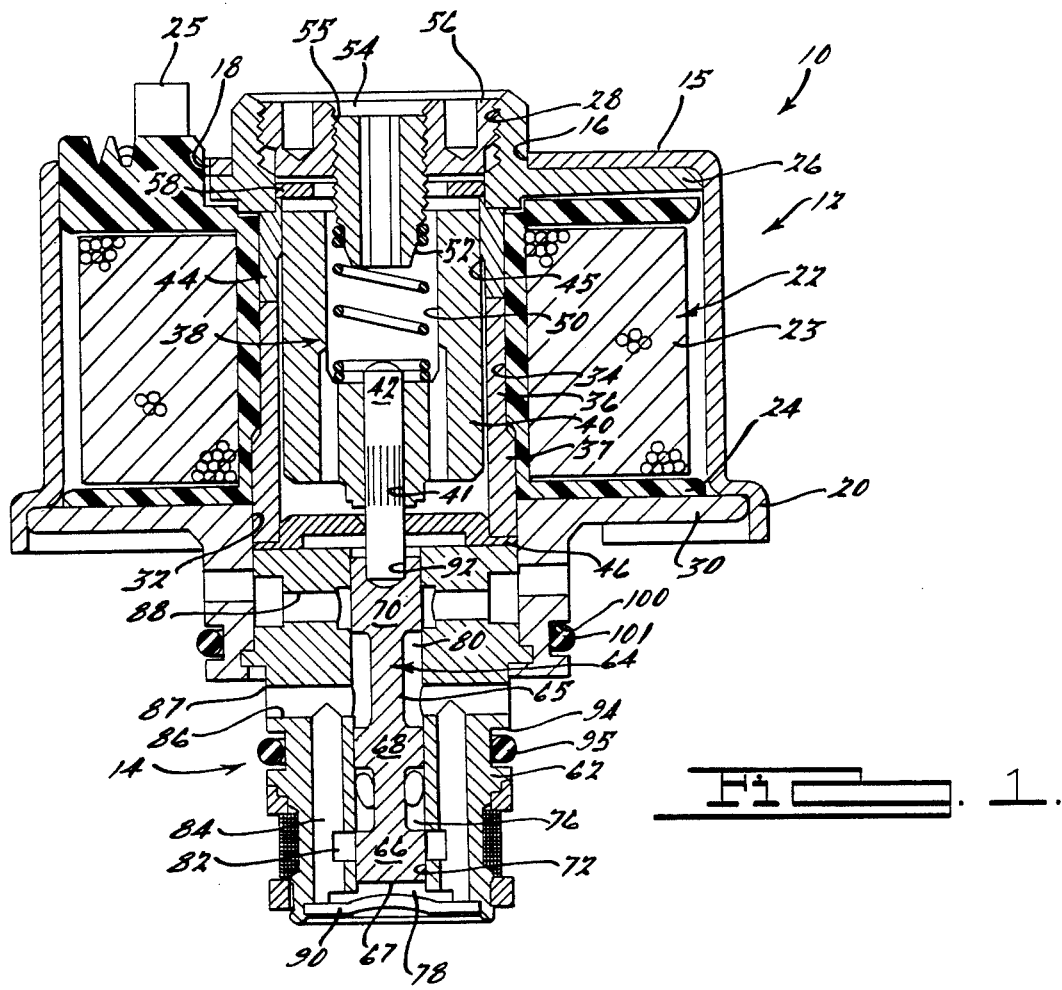
FIG. 1 is a cross-sectional view through a variable force solenoid valve assembly, shown in an energized position, in accordance with the preferred embodiment of the present invention.
Figure 2:
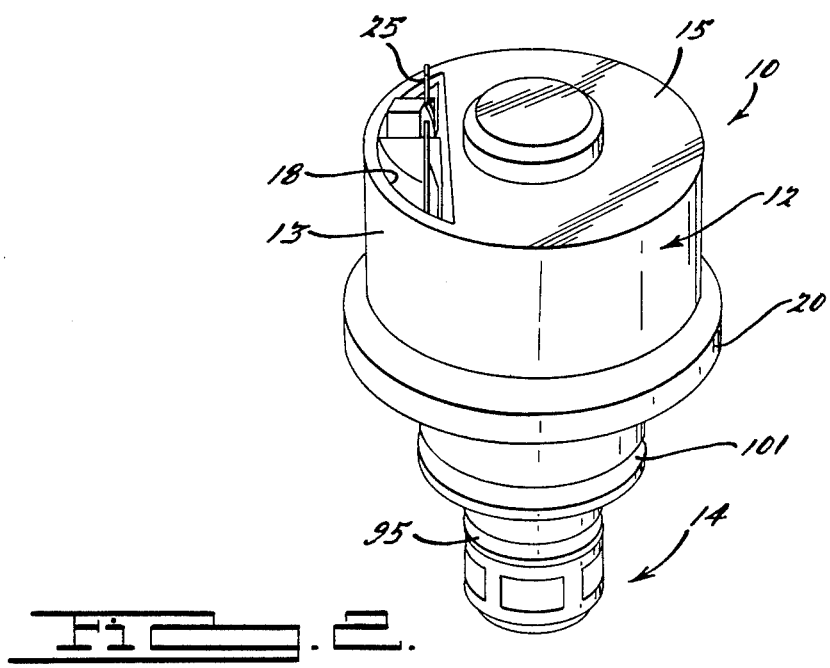
FIG. 2 is a pictorial view of an assembled variable force solenoid valve assembly showing electrical connections.
Figure 3:
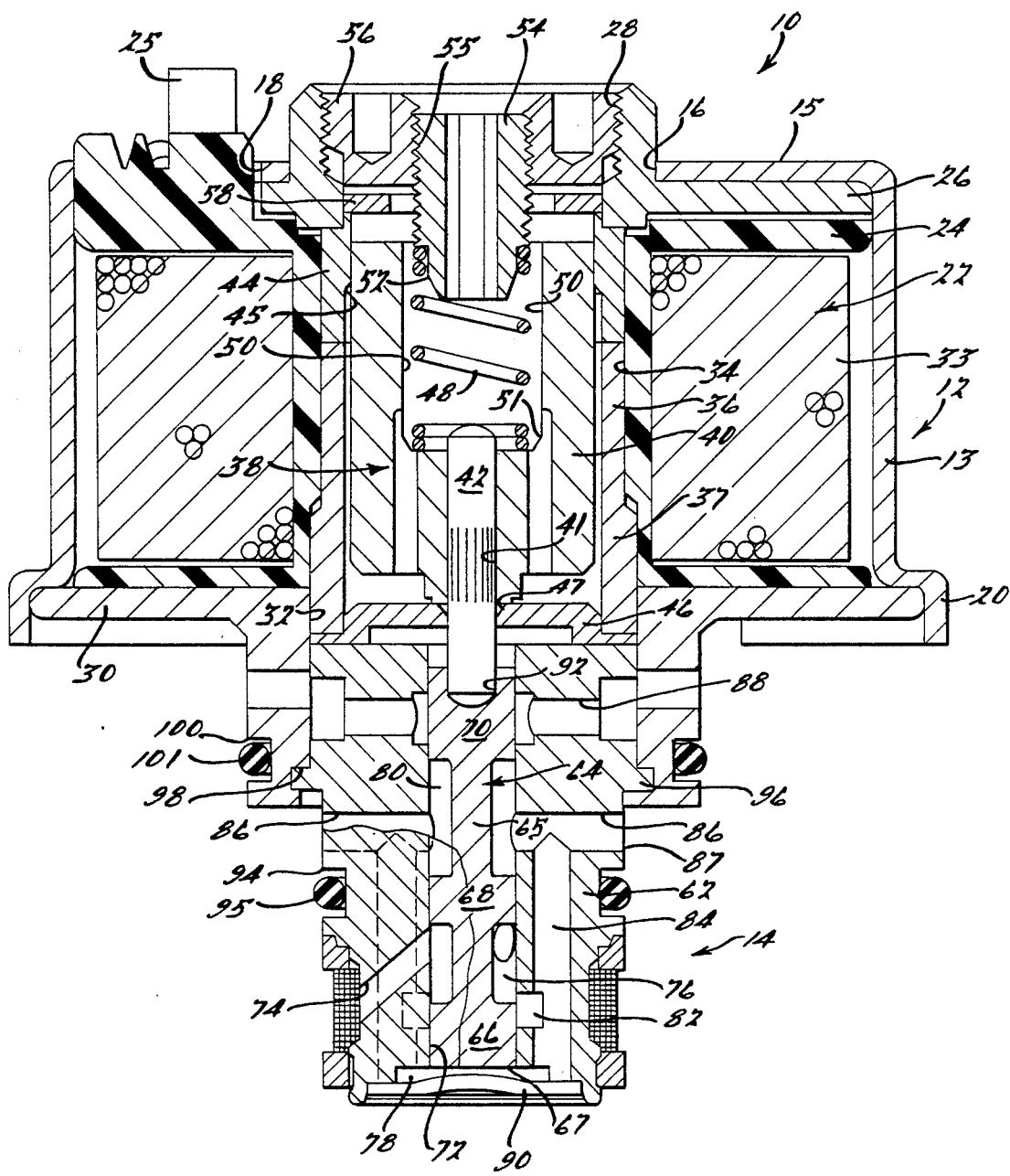
FIG. 3 is an enlarged cross-sectional view through a variable force solenoid valve assembly, shown in a de-energized position, in accordance with the preferred embodiment of the present invention.

A variable force solenoid valve assembly in accordance with this invention is shown in cross-section in FIGS. 1 and 3 and is generally designated there by reference number 10. Variable force solenoid valve assembly 10 is designed to be installed in an automatic transmission controller assembly having a plurality of ON/OFF solenoid valve assemblies and other related components such as is disclosed in U.S. Pat. No. 4,678,006 which is hereby incorporated by reference. In operation, variable force solenoid valve assembly 10 receives an electrical input signal from a remote electronic controller device which would cause the variable force solenoid valve assembly 10 to controllably regulate the fluid pressure within various flow channels of an automatic transmission. Such pressure regulation permits finely tuned calibration of the rate and impact of gear engagement which is generated by the ON/OFF solenoid valves described in detail in the above-identified reference patent.

FIGS. 1 and 3 provide a detailed illustration of the internal working components of variable force solenoid valve assembly 10. The variable force solenoid valve assembly 10 has two major sub-assemblies consisting of solenoid assembly 12 and valve body assembly 14. Specifically, solenoid assembly 12 is enclosed by housing 13, having generally closed end 15 with central bore 16 and terminal bore 18. The opposite end of housing 13 is opened and defines annular shoulder 20, such that housing 13 is slightly flared at that end. Disposed within housing 13 is a coil assembly 22 comprised of coil 23 and spool-shaped boddin 24. Coil 23 is electrically connected to a pair of upstanding terminals 25 (one shown) which extend through terminal bore 18. A first flux collector 26 is positioned at one end of coil assembly 22 and forms a central threaded bore 28. At the opposite end of coil assembly 22, a second flux collector 30 is provided with central bore 32. Following assembly of valve body assembly 14 to solenoid assembly 12, the lower edge of housing 13 is deflected inwardly to interlock with flux collector 30. Coil assembly 22 defines a central bore 34. Tubular insert 36 is disposed within coil assembly bore 34 and has a radially outwardly extending end 37. Armature assembly 38 is positioned within coil assembly bore 34 such that it can translate therein. Armature assembly 38 comprises a two-piece structure consisting of armature body member 40 and pin member 42. Armature body member 40 has a first opened end and a second generally closed opposite end having a central bore 41. Pin member 42 has an outer diameter which provides an interference fit with the inside diameter of central bore 41. The overall length of armature assembly 38 is defined prior to assembly into solenoid assembly 12 and corresponds to specific operating positions required for variable force solenoid valve assembly 10. Pin member 42 is permanently maintained within central bore 41 via an assembly staking operation. Energization of coil 23 produces an attracting force on armature assembly 38 urging it to move in an upward direction, with reference to the orientation of the elements shown in FIG. 1. This action occurs through a magnetic conduction path in which magnetic fields are transferred through flux collector 26, armature assembly 38, flux collector 30 and housing 13, thereby providing a working air-gap between the first end of armature body member 40 and flux collector 26. Armature assembly 38 is guided to remain in a desired longitudinal orientation within bore 34 of tubular insert 36 through the guiding action provided by tubular spacer 44 and guide bearing 46, which are of non magnetic materials which are stable over a wide temperature range. Tubular spacer 44 has a radially inwardly extending surface 45 which acts to guide the upper portion of armature body member 40 and is maintained in this position through clamping engagement between tubular insert 36 and flux collector 26. Guide bearing 46 has a central bore 47 through which pin member 42 translates. Tubular spacer 44 and guide bearing 46 provide a low friction means for supporting armature assembly 38 for axial movement without employing costly precision linear ball bearings.

Variable force solenoid valve assembly 10 includes a mechanism for providing an adjustable compliant loading onto armature assembly 38 which opposes forces imposed through energization of coil 23. The mechanism includes coil spring 48 disposed within central bore 50 provided in the first end of armature body member 40. One end of coil spring 48 rest on a lower surface 51 provided in bore 50 while the opposite end of coil spring 48 rests on spring seat 52 provided on adjustment screw 54. Adjustment screw 54, made from non-magnetic materials, includes a portion having a threaded external surface which threadingly engages a threaded central bore 55 provided in adjustment plug 56. Adjustment plug 56 is, in turn, threaded into threaded bore 28 of flux collector 26. By adjustably changing the positioning of adjustment screw 54, a variation in the biasing force exerted by coil spring 48 is provided by changing the amount of pre-compression of spring 48. Adjustment plug 56, on the other hand, is made of a magnetic material which provides means for variably adjusting the minimum working air-gap distance between armature body member 40 and flux collector 26. During operation of variable force valve assembly 10, armature stop 58 is provided to make direct contact with the first end of armature body member 40. In solenoid design, it is typically necessary to control the minimum air-gap distance since the attraction force between the surfaces of an air-gap for a given current flow increases exponentially with decreased air-gap distance. When separation distances become extremely small, a change in state of the solenoid valve assembly following de-energization becomes less reliable if any residual magnetism is present when no electrical current is flowing through the coil. Direct contact or excessively small air-gap distances should be avoided since they can detrimentally effect the linearity characteristics of the solenoid valve assembly.

In accordance with another feature of this invention, the fluid control components associated with valve body assembly 14 of variable force solenoid valve assembly 10 are shown in FIGS. 1 and 3. Variable force solenoid valve assemblies are provided in automatic transmission controller devices to enable control over fluid pressures to be provided in response to a current input signal to coil 23. Such control is achieved by selectively reducing the pressure of fluid at inlet pressure to an outlet control pressure by restricting fluid flow and through venting fluid to a transmission sump.

In fluid control valve design, it is typically necessary to compensate for various damping forces acting upon the valving during operation which can cause vibrational instability. Such damping forces include frictional, viscous, magnetic (in solenoid applications) and hydraulic forces. It is desirable to stabilize the vibrational or oscillatory characteristics of the valving which results in decay or attenuation of the amplitude of vibration with time. Attenuation of vibration amplitude is provided, according to the preferred embodiment of this invention, through the utilization of flow control components designed to be "self-balancing" so as to readily attain equilibrium conditions during operation.

Valve body assembly 14 is primarily composed of valve body 62 and spool valve 64. Spool valve 64 has a central stem 65 and first, second and third lands, 66, 68 and 70 respectively, which radially extend from stem 65. Valve body 62 has a central bore 72 axially aligned with armature assembly 38 along a common axis. Valve body 62 further defines one or more radially extending passages 74 which communicate from the external surface of valve body 62 to a first chamber 76 which is exposed to fluid at inlet pressure. Chamber 76 is defined by the volume between first spool valve land 66 and second spool valve land 68 within valve body central bore 72. A second chamber 78 is defined by the volume within valve body central bore 72 below lower surface 67 of first spool valve land 66. A third chamber 80 is provided within valve body central bore 72 between second spool valve land 68 and third spool valve land 70. An annular orifice 82 is provided extending through valve body central bore 72 which fluidly communicates with first chamber 76. Valve body 62 further defines one or more passages 84, extending upwardly and coaxially with central bore 72, provides fluid communication between first chamber 76 at inlet pressure, orifice 82, and second chamber 78 at control pressure. One or more radially extending passages 86 provide fluid communication at control pressure between passage 84, third chamber 80 and outlet port 87. One or more radially extending exhaust passages 88 provide fluid communication between third chamber 80 and a transmission sump (not shown). Welsh plug 90 encloses the space at the lower end of valve body assembly 14.

Pin member 42 of armature assembly 38 is in pressed, fitted engagement with spool valve 64 via a bore 92 provided at the upper end of third land 70. This engagement permits spool valve 64 to move in concert with armature assembly 38. The external peripheral surface of valve body 62 includes an annular groove 94 having seal 95 disposed therein. The external surface of valve body 62 further defines a radially extending shoulder 96 which is disposed within a similarly configured groove 98 provided in flux collected 30 to provide proper orientation of the components during assembly. Flux collector 30 defines groove 100 having seal 101 disposed therein. This arrangement provides separated fluid passages wherein inlet pressure is provided via inlet passage 74 and control pressure is provided through passages 84 and 86. Fluid can be vented from the valve body assembly 14 to an external sump through exhaust passage 88.

Operation of the variable force solenoid assembly valve 10 will now be explained with reference to FIGS. 1 and 3. Utilization of a three land spool valve 64 interactive with fluid flow passages 74, 84, 86 and 88 and chambers 76, 78 and 80, as configured in valve body 62, generates postive hydraulic damping characteristics during fluid flow conditions. Positive damping promotes "self-balancing"characteristics which tend to attenuate unstable spool valve vibration or oscillation commonly realized in variable force solenoid valves employing spool valves having two lands. Three land spool valve 64, attenuates the amplitude of spool valve oscillation during changing flow conditions so as to provide a stable, controllable valve body assembly 14 during dynamic flow conditions and static equilibrium conditions. Specifically, fluid at inlet pressure is provided through inlet passage 74 into first chamber 76. The fluid is permitted to flow from first chamber 76 into passage 84 through annular orifice 82 which extends through central bore 72 of valve body 62. First land 66 of spool valve 64 acts to restrict the flow of fluid through orifice 82 thereby defining a first flow restriction. Fluid in passage 84 communicates with second chamber 78 hydraulically acts upon bottom surface 67 of first spool valve land 66. Passage 84 also fluidly communicates with passage 86 and with the third chamber 80. This fluid flow causes a resultant force to act on spool valve 64, which urges it in an upward direction to a position where the force exerted by spring 48, armature assembly 38, and the fluid pressure acting on spool valve 64 within first chamber 76, second chamber 78 and third chamber 80 are balanced. The pressure acting in second chamber 78 on bottom surface 67 of first spool valve land 66 is defined to be the feedback pressure which is substantially equal to the control pressure flowing through outlet port 87. Preferably, in the absence of current flow through coil 23, such force balancing causes spool valve 64 to be displaced upwardly to increase the first fluid flow restriction between first spool valve land 66, orifice 82 and first chamber 76. This flow restriction, together with a second flow restriction which permits intentional fluid leakage between third chamber 80, third spool valve land 70 and exhaust passage 88 to a sump will provide a regulated control pressure at some predetermined level, for example, 93 psi when the inlet pressure is about 140 psi. The resultant forces of the fluid acting on each of spool valve lands 66, 68 and 70 respectively, provide a stable, self-balanced spool valve which enables accurate regulation of the outlet control pressure. Controlled modulation over the control pressure is provided by selectively energizing coil 23. A given level of current through coil 23 will cause a magnetic force to be applied onto armature assembly 38 urging it in an upward direction, which is opposed by the force imposed by spring 48 and aided by the feedback pressure acting on the lower surface 67 of first land 66. This action has the effect of unbalancing the above described equilibrium. The resultant force causes armature assembly 38 and spool valve 64 to move in an upward direction and seek a new equilibrium condition. Such action further restricts the flow between first chamber 76, orifice 82 and passage 84, and simultaneously reduces the restriction of fluid flow between third chamber 80 and exhaust passage 88 provided by third land 70 since the extent of overlap between the bore 72 and third land 70 becomes reduced. Accordingly, controlled energization of coil 23 enables the fluid pressure of the control pressure to be variably reduced from the non-energized equilibrium control pressure in a controlled manner.

Stable control of spool valve movement upon controlled energization of coil 23 inhibits natural self-excited oscillation, thereby reducing the time for reaching new equilibrium conditions after controlled energization of the coil 23.

During initial assembly and calibration, fluid at inlet pressure is applied through inlet passages 74. A non-magnetic rod (not shown) is inserted through the threaded central bore provided in adjustment plug 56 to engage coil spring 48. Coil spring 48 is compressed with the calibration rod to obtain a desired control pressure at outlet port 87. Next, a voltage signal is applied to coil 23 to provide a predetermined current, preferably 0.8 amps, while the coil spring 48 is maintained as compressed by the calibration rod. Adjustment plug 56 is adjustably threaded inwardly until a desired control pressure is provided at outlet port 87 which occurs when a proper air-gap distance exists between flux collector 26 and the upper portion of armature assembly 38. The current is then removed from the assembly 10 and the calibration rod is removed so as to allow installation of adjustment screw 54. Adjustment screw 54 is adjustably threaded into adjustment plug 56 to re-obtain the original outlet control pressure.

FIG. 1 illustrates variable force solenoid valve assembly 10 in an energized state. In this condition, fluid flow through chamber 76 into passage 84 is restricted from flowing through orifice 82 by the upper surface of first spool valve land 66 so as to controllably regulate the pressure of the fluid flowing through passage 84. FIG. 3 illustrates variable force solenoid valve assembly 10 in a de-energized state. The flow restriction between first chamber 76 and passage 84 is reduced so as to permit fluid at a greater control pressure to flow through passage 84 to outlet port 87. In this condition, the flow restriction between exhaust passage 88 and third spool valve land 70, is increased so as to limit the leakage flow of fluid at control pressure through exhaust passage 88 to the sump.

While the above description constitutes the preferred embodiments of the present invention, it will be appreciated that the invention is acceptable to modification, variation and change without departing from the proper scope and fair meaning of the accompanying claims.

What is claimed is:

1. A variable force solenoid valve assembly for controllably reducing a fluid inlet pressure to an outlet control pressure in response to an electrical input signal, comprising:
   a solenoid assembly having a movable armature assembly adapted to translate within said solenoid assembly in response to said electrical input signal;
   a valve body defining an outlet port and a central bore axially aligned with said armature assembly adapted to fluidly communicate with said outlet port, said valve body coupled to said solenoid assembly;
   a spool valve disposed within said valve body central bore and secured to said armature assembly for translational movement therewith, said spool valve having a central stem and first, second and third lands radially extending from said stem so as to define first, second and third chambers within said valve body central bore, said first chamber provided between said first and second spool valve lands, said second chamber defined by a surface of said first land opposite said central stem and said valve body central bore, and said third chamber being defined between said second and third spool valve lands;
   first passage means for communicating fluid at said inlet pressure to said first chamber;
   second passage means for communicating fluid at said outlet control pressure to said second and third chambers;
   first flow restriction means associated with said first spool valve land for controllably restricting fluid communication between said first chamber and said second passage means;
   third passage means for fluidly connecting said second passage means to said third chamber and said outlet port; and
   second flow restriction means associated with said third spool valve land for restricting the flow of fluid and said outlet control pressure within said third chamber.

2. A variable force solenoid valve assembly according to claim 1 wherein said solenoid assembly further comprises:
   an energization coil assembly defining a longitudinal bore, said armature assembly disposed in said bore and adapted to translate in response to energization of said coil assembly;
   pole means for defining a working air-gap across which magnetic fields are transferred thereby generating an attracting force between said pole means and said armature assembly which urges said armature assembly to move toward said pole means when said coil assembly is energized; and
   spring means disposed between said pole means and said armature assembly urging said armature assembly away from said pole means when said coil assembly is de-energized.

3. A variable force solenoid valve assembly according to claim 2 wherein
   movement of said armature assembly toward said pole means upon controlled energization of said coil assembly produces corresponding movement of said spool valve within said valve body central bore so as to decrease the flow of fluid through said first flow restriction means while increasing the flow of fluid through said second flow restriction means so as to decrease the regulated control pressure, and whereby, upon de-energization of said coil assembly, said spring means urges said armature and said spool valve away from said pole means so as to increase the fluid flow through said first flow restriction means while decreasing the fluid flow through said second flow restriction means so as to increase the regulated control pressure.

4. A variable force solenoid valve assembly according to claim 3 wherein fluid forces within said first chamber at said inlet pressure and fluid forces acting within said second and third chambers at a regulated control pressure produce positive damping control of said spool valve thereby decreasing the amplitude of natural oscillation of said spool valve during static equilibrium conditions.

5. A variable force solenoid valve assembly according to claim 3 wherein said valve body central bore is axially aligned with a central longitudinal axis of said armature assembly such that a surface of said spool valve third land opposite said central stem engages said armature assembly via a pin member.

6. A variable force solenoid valve assembly according to claim 5 wherein said armature assembly comprises a tubular member having a first end within which said spring means is disposed and a second generally closed end defining a central bore, and a pin member having a first end permanently secured within said central bore of said tubular member and a second end disposed within a bore provided on an upper surface of said spool valve third land.

7. A variable force solenoid valve assembly according to claim 3 further comprising at least one electrical connector terminal for providing said electrical input signal to said coil assembly.

8. A variable force solenoid valve assembly according to claim 3 wherein said first flow restriction means is associated with an annular orifice extending through said valve body central bore to provide fluid communication between said first chamber and said second passage means, said annular orifice located in close proximity to said surface of said first land adjacent said central stem of said spool valve such that translation movement of said spool valve acts to variably restrict the flow of fluid through said annular orifice so as to define a first flow restriction.

9. A variable force solenoid valve assembly according to claim 3 wherein said second flow restriction means is associated with fourth passage means communicating fluid at control pressure within said third chamber to a sump, and wherein fluid flow through said fourth passage means is restricted by said third land of said spool valve such that translational movement of said spool valve variably restricts fluid flow through said fourth passage means so as to define a second flow restriction.

10. A variable force solenoid valve assembly for use in an automatic transmission controller for controllably reducing a fluid inlet pressure to a control outlet pressure, comprising:
   an energization coil assembly defining a central bore;
   a movable armature assembly disposed in said central bore and adapted to translate in said central bore in response to energization of said coil assembly;
   a first flux collector magnetically coupled to said coil assembly, said first flux collector having adjustment means for varying the minimum air-gap between said armature assembly and said first flux collector across which magnetic fields are transferred for generating an attracting force between said first flux collector and said armature assembly, said attracting force urging said armature assembly to move toward said first flux collector when said coil assembly is energized;
   spring means disposed between said adjustment means and said armature assembly urging said armature assembly away from said first flux collector when said coil assembly is de-energized;
   a second flux collector having a central bore and being disposed below, and adjacent to, said coil assembly;
   a housing for enclosing said first flux collector, said coil assembly, and said second flux collector;
   a valve body defining a central bore, said valve body fixedly disposed within said central bore of said second flux collector;
   a spool valve disposed within said valve body central bore having a central stem and first, second, and third lands radially extending from said stem;
   means for coupling said spool valve to said armature assembly so as to permit movement of said spool valve within said valve body central bore in response to movement of said armature assembly;
   a first chamber within said valve body central bore defined between said first and second lands of said spool valve;
   a second chamber defined by said valve body central bore and a surface of said first land opposite said central stem;
   a third chamber within said valve body central bore defined between said second and third lands of said spool valve;
   first passage means for communicating fluid at said inlet pressure to said first chamber;
   second passage means for communicating fluid at control pressure to said second chamber;
   third passage means for communicating fluid at control pressure from said second passage means to said third chamber and said automatic transmission;
   fourth passage means for communicating fluid at control pressure within said third chamber to a sump;
   first flow restriction means for controllably restricting the flow of fluid between said first chamber and said second passage means in response to movement of said armature assembly;
   second flow restriction means for controllably restricting the flow of fluid between said third chamber and said fourth passage means in response to movement of said armature assembly; and
   whereby, said control pressure is controllably regulated in response to a resultant force imposed on said spool valve through the interaction of said spring means, the controlled energization and de-energization of said coil assembly and said fluid pressure acting on said spool valve within said first, second and third chambers.

11. A variable force solenoid valve assembly according to claim 10 wherein said fluid at inlet pressure acting upon said first and second lands within said first chamber, said fluid at control pressure acting upon surfaces of said spool valve within said second and third chambers, said biasing force of said spring means acting on said spool valve, and said attracting force acting on said armature assembly interact so as to produce positive damping of said spool valve such that natural oscillation of said spool valve is inhibited.

12. A variable force solenoid valve assembly according to claim 10 further comprising spring adjust means for varying the compliant force of said spring means acting on said armature assembly, said spring adjustment means beng associated with said first flux collector.

13. A variable force solenoid valve according to claim 12 wherein said adjustment means comprise a magnetic adjustment plug threaded into a central threaded bore provided in said first flux collector for varying the minimum air-gap between said armature assembly and said adjustment plug, said adjustment plug having a central threaded bore adapted to receive said spring adjustment means for varying the compliant force of said spring means, and an annular armature stop disposed within said first flux collector bore adjacent said armature assembly for inhibiting direct engagement of said armature assembly with said adjustment plug.

14. A variable force solenoid valve assembly according to claim 13 wherein said spring adjustment means comprises a non-magnetic adjustment screw threaded into said central threaded bore of said adjustment plug, said screw having a spring seat end for engaging said spring means whereby movement of said adjustment screw acts to vary the compliant force of said spring means.

15. A variable force solenoid valve assembly according to claim 10 wherein said armature assembly comprises a tubular member having an open end and a generally closed opposite end, and a pin member having a first end permanently secured within a central bore provided on said closed end of said armature assembly, said spring means being disposed within said open end of said tubular member.

16. A variable force solenoid valve according to claim 15 wherein said second end of said pin member extends longitudinally into said valve body central bore and is affixed to said spool valve at a surface of said third land opposite said stem, said engagement of said spool valve to said armature assembly providing low friction means for reducing the frictional drag forces acting on said armature assembly and said spool valve during translational movement thereof.

17. A variable force solenoid valve assembly according to claim 10 wherein said fluid pressure within said second chamber is further defined as feed-back pressure, said feed-back pressure within said second chamber opposing said inlet pressure within said first chamber so as to augment the increased flow restriction caused by said first flow restriction means upon energization of said coil assembly, and wherein said fluid pressure within said third chamber acts to oppose said inlet pressure acting within said first chamber so as to oppose the flow restriction caused by energization of said coil assembly, thereby generating positive damping control of said spool valve within said valve body.

18. A variable force solenoid valve assembly according to claim 10 wherein said first flow restriction means comprises an annular orifice extending through said valve body central bore so as to provide fluid communication between said first chamber and said second passage means, such that translational movement of said spool valve provides a flow restriction through said orifice so as to variably regulate the flow of fluid thereby defining said control pressure.

19. A variable force solenoid valve assembly according to claim 18 wherein said second flow restriction means is defined by the overlap of said third land of said spool valve between said third chamber and said fourth passage means.

20. A variable force solenoid valve assembly according to claim 19 wherein energization of said coil assembly generates an attracting force such that said armature assembly and said spool valve move toward said first flux collector so as to increase the first flow restriction between said first land and said annular orifice while decreasing the second flow restriction between said third chamber and said fourth passage means such that said outlet control pressure is proportionately decreased.

21. A variable force solenoid valve assembly according to claim 20 wherein upon de-energization of said coil assembly said spring means urges said armature assembly away from said first flux collector which correspondingly moves said spool valve so as to decrease the first flow restriction between said first land and said orifice while increasing the second flow restriction between said third chamber and said fourth passage so as to proportionately increase said control pressure.

22. A variable force solenoid valve assembly according to claim 10 wherein said coil assembly, said armature assembly, said first flux collector, said spring means, said second flux collector and said housing define a solenoid assembly.

23. A variable force solenoid valve assembly according to claim 10 wherein said valve body and said spool valve define a valve assembly which is secured to said solenoid assembly.

* * * * *

UNITED STATES PATENT AND TRADEMARK OFFICE
CERTIFICATE OF CORRECTION

PATENT NO. : 4,947,893
DATED : August 14, 1990
INVENTOR(S) : Ellsworth S. Miller et al.

It is certified that error appears in the above-identified patent and that said Letters Patent is hereby corrected as shown below:

Title page, [73] Assignee:, add --and Ford Motor Company, Dearborn, Mich.--.

Column 8, line 3, claim 1, after "fluid", "and" should be --at--.

Column 8, line 41, claim 4, after "forces", insert --acting--.

Column 9, line 6, claim 8, "translation" should be --translational--.

Column 10, line 39, claim 12, "beng" should be --being--.

Signed and Sealed this

Seventeenth Day of March, 1992

Attest:

HARRY F. MANBECK, JR.

*Attesting Officer*  *Commissioner of Patents and Trademarks*